United States Patent
Feygin et al.

(10) Patent No.: US 7,625,211 B2
(45) Date of Patent: Dec. 1, 2009

(54) VASCULAR-ACCESS SIMULATION SYSTEM WITH SKIN-INTERACTION FEATURES

(75) Inventors: David Feygin, Washington, DC (US); Chih-Hao Ho, Reston, VA (US)

(73) Assignee: Laerdal DC, Silver Springs, MD (US)

( * ) Notice: Subject to any disclaimer, the term of this patent is extended or adjusted under 35 U.S.C. 154(b) by 905 days.

(21) Appl. No.: 10/807,017

(22) Filed: Mar. 23, 2004

(65) Prior Publication Data

US 2005/0214725 A1 Sep. 29, 2005

(51) Int. Cl.
G09B 23/28 (2006.01)

(52) U.S. Cl. .................. 434/275; 434/262; 434/272

(58) Field of Classification Search .......... 434/262–275
See application file for complete search history.

(56) References Cited

U.S. PATENT DOCUMENTS

| | | | |
|---|---|---|---|
| 2,704,897 A * | 3/1955 | Lade .......................... 434/272 |
| 3,704,529 A | 12/1972 | Cioppa |
| 3,722,108 A | 3/1973 | Chase |
| 4,134,218 A * | 1/1979 | Adams et al. ................ 434/267 |
| 4,380,439 A * | 4/1983 | Kreitenberg ................ 434/268 |
| 4,850,960 A | 7/1989 | Grayzel |
| 5,472,345 A | 12/1995 | Eggert |
| 5,821,920 A | 10/1998 | Rosenberg et al. |
| 5,853,292 A | 12/1998 | Eggert et al. |
| 6,038,488 A | 3/2000 | Barnes et al. |
| 6,088,020 A | 7/2000 | Mor |
| 6,398,557 B1 * | 6/2002 | Hoballah ..................... 434/272 |
| 6,443,735 B1 * | 9/2002 | Eggert et al. ................ 434/262 |
| 6,470,302 B1 | 10/2002 | Cunningham et al. |
| 6,527,558 B1 | 3/2003 | Eggert et al. |
| 6,538,634 B1 | 3/2003 | Chui et al. |
| 6,568,941 B1 | 5/2003 | Goldstein |
| 6,575,757 B1 * | 6/2003 | Leight et al. ................ 434/273 |
| 6,773,263 B2 * | 8/2004 | Nicholls et al. ............. 434/267 |
| 7,182,602 B2 | 2/2007 | Lakin et al. |
| 7,202,851 B2 * | 4/2007 | Cunningham et al. ....... 345/156 |
| 2003/0031993 A1 | 2/2003 | Pugh |
| 2003/0069719 A1 | 4/2003 | Cunningham et al. |
| 2003/0210259 A1 | 11/2003 | Liu et al. |
| 2004/0002045 A1 | 1/2004 | Wellman et al. |
| 2004/0024418 A1 | 2/2004 | Irion et al. |
| 2004/0030303 A1 | 2/2004 | Prais et al. |
| 2004/0076940 A1 | 4/2004 | Alexander et al. |
| 2004/0097806 A1 | 5/2004 | Hunter et al. |

FOREIGN PATENT DOCUMENTS

| | | |
|---|---|---|
| FR | 2622721 A | 5/1989 |
| WO | 03096307 A1 | 11/2003 |

* cited by examiner

*Primary Examiner*—Xuan M Thai
*Assistant Examiner*—Timothy Musselman
(74) *Attorney, Agent, or Firm*—DeMont & Breyer, LLC

(57) ABSTRACT

The illustrative embodiment is a simulation system that provides realistic training and practice for vascular-access procedures without using human subjects. The simulator includes a data-processing system and a haptics interface device. The haptics device provides the physical interface for performing vascular-access procedures by manipulating a needle/catheter module to simulate needle insertion, etc. Some embodiments of the system include a palpation module, a skin-stretch module, or both. The palpation module provides an ability to practice palpation and occlusion techniques, while the skin-stretch module provides an ability to practice a skin-stretch technique.

17 Claims, 4 Drawing Sheets

US 7,625,211 B2

VASCULAR-ACCESS SIMULATION SYSTEM WITH SKIN-INTERACTION FEATURES

STATEMENT OF RELATED CASES

This case is related to U.S. patent application Ser. Nos. 10/807,047, 10/806,531, 10/807,016, and 10/887,348, all of which are incorporated by reference herein.

FIELD OF THE INVENTION

The present invention relates generally to systems that simulate medical procedures for the purposes of training or accreditation. More particularly, the present invention relates to a system, apparatus and subsystems for simulating vascular-access procedures.

BACKGROUND OF THE INVENTION

Medical practitioners, such as military medics, civilian emergency-medical personnel, nurses, and physicians, routinely perform vascular-access procedures (e.g., IV insertion, central venous-line placement, peripherally-inserted central catheter, etc). It is desirable for a practitioner to be proficient at performing these procedures since the proficient practitioner is far less likely to injure a patient and is almost certain to reduce the patient's level of discomfort.

Becoming proficient in vascular-access procedures requires practice. In fact, the certification and re-certification requirements of some states mandate a minimal number of needle sticks, etc., per year per provider. Historically, medical practitioners practiced needle-based procedures on live volunteers. More recently, simulation techniques and devices have been developed to provide training in vascular-access procedures without the use of live volunteers. U.S. Pat. No. 6,470,302 ("the '302 patent") surveys the art of medical-simulation devices and also discloses a vascular-access simulation system.

The vascular-access simulation system that is disclosed in the '302 patent includes an "interface" device and a computer system. To practice a vascular-access procedure, a user manipulates an "instrument," referred to in the patent as a "catheter unit assembly," which extends from the device and serves as a catheter-needle. Potentiometers and encoders within the interface device track the motion and position of the instrument and relay this information to the computer system. The computer system performs a simulation of the surface and subsurface anatomy of human skin, and determines the effect of the instrument's motion on the skin's anatomy. Simulated results are displayed by the computer system. Using the motion information from the interface device, the computer system also generates a control signal that controls a force-feedback system that is coupled to the instrument. The force-feedback system generates various resistive or reactive forces that are intended to simulate the forces that are experienced by a medical practitioner during an actual vascular-access procedure. The user senses these forces during manipulation of the instrument.

The system that is disclosed in the '302 patent has many shortcomings that substantially limit its utility as a training or accreditation tool. In particular, among other drawbacks, the system that is disclosed in the '302 patent provides only a limited ability to practice and realistically mimic certain skin-interaction techniques that are an important part of vascular-access procedures. These skin-interaction techniques include "palpation," "skin stretch," and "occlusion."

Palpation is a multi-purpose technique. It can be used by a practitioner to locate hidden veins. Veins might not be readily locatable due to the advanced age or poor physical condition of the patient, the procedure being performed, or due to other reasons. To palpate for hidden veins, the practitioner pats the skin. Palpation can also be used to obtain information about a candidate vein once it has been located. In particular, the practitioner can determine whether the candidate vein is sufficiently engorged. A practitioner can also determine, via palpation, whether a vein is sufficiently straight (at an intended insertion point) for catheterization. To palpate a vein to obtain this type of information, the practitioner moves one or two fingers lightly over the candidate vein.

Occlusion is a technique that is performed during catheterization. Specifically, a finger or thumb of the non-dominant hand is used to apply pressure on the catheter at the insertion point so that no blood leaks out of the hub of the catheter when the stylet is removed. To practice the third technique mentioned above—the skin-stretch technique—the thumb of the non-dominant hand pulls a patient's skin, rendering it taut. This reduces a patient's level of discomfort and anchors the vein so that it doesn't move during angiocatheter insertion.

Of these three skin-interaction techniques, only the "skin stretch" can be practiced using the device that is disclosed in the '302 patent. And the mechanism that is responsible for skin stretch has a limited ability to realistically simulate this procedure. In particular, the "skin" on which the skin stretch technique is practiced is a belt—a "mock" skin—that bears little resemblance to real skin. A resilient backing is disposed beneath the belt to simulate the resiliency of skin. (See, col. 10, lines 49+.) Furthermore, the module on which the skin-stretch technique is practiced resides within a casing that is attached to and separate from the housing in which the needle-insertion procedure is practiced. This structural arrangement does nothing to promote a user's "suspension of disbelief." That is, it is clear that the technique is being performed on a machine that is not the least bit suggestive of human anatomy.

The inability to practice and realistically simulate these skin-interaction techniques limits the utility of prior-art vascular-access simulation systems for use as a training or accreditation tool.

SUMMARY

The illustrative embodiment of the present invention is a simulation system that provides realistic training and practice for vascular-access procedures without using human subjects. Unlike most prior-art simulation systems, some embodiments of the present system provide a realistic simulation of forces as well as an ability to practice several important skin-interaction techniques that are normally performed as a part of many vascular-access procedures.

In accordance with the illustrative embodiment, vascular-access simulator includes a data-processing system and an interface device, referred to herein as a "haptics device." The haptics device provides the physical interface for performing vascular-access procedures. More particularly, a user inserts a needle/catheter module into the haptics device and manipulates it to simulate needle insertion, cannulation, etc.

In accordance with the illustrative embodiment, the haptics device includes a palpation module. In some embodiments, the palpation module enables a user to perform two skin-interaction techniques: palpation and occlusion. With regard to the palpation technique, the palpation module advantageously provides one or more of the following functions:

enables a user to search for a vein; provides tactile feedback to user; and provides an indirect measure of palpation force.

Furthermore, in some embodiments of the palpation module, a vein that is tactilely discernable (i.e., felt) by a user is not visually discernable by the user. Also, in some embodiments, the perceived "stiffness" of a vein, which is indicative of its degree of engorgement, is controllable. An illustrative structural configuration of the palpation module that provides the desired functionality and certain desirable characteristics is presented.

In some embodiments, the haptics device includes a skin-stretch module. The skin-stretch module enables a user to perform a skin-stretch technique that accompanies many vascular-access procedures. The skin-stretch module advantageously enables a user to stretch a pseudo skin, provides appropriate and realistic sensory feedback to the user, and quantifies the amount of skin stretch that has occurred.

Sensors within the haptics device monitor the motion and position of the needle/catheter module as well as the application of pressure, etc., and the movement of pseudo skin during the skin-interaction techniques. The sensors generate signals indicative of the monitored activity and transmit the signals to the data processing system.

The data processing system processes the information acquired by the sensors and, in conjunction with an anatomical model, determines the effect of a user's manipulations on the surface and subsurface features of the virtual body part on which the simulated vascular-access procedure is being performed. Results are displayed by the computer system. The results include, for example, a three-dimensional rendering of the body part of interest, a visual indication of the position of the needle/catheter relative to the body part, and a visual indication of how the needle/catheter affects that body part.

Using the information obtained from the sensors, the data processing system determines the various resistive forces that would arise from the user's manipulation of the needle/catheter assembly through the simulated anatomy. Based on this determination, the data processing system generates a control signal and transmits it to the haptics device. Responsive to the control signal, the haptics device generates an appropriate amount of resistance to movement of the needle/catheter assembly.

DETAILED DESCRIPTION

The terms and phrases listed below are defined for use in this specification as follows:

"End Effector" means a device, tool or instrument for performing a task. The structure of an end effector depends on the intended task. For example, in the illustrative embodiment, the end effector is intended to be used to simulate a vascular access procedure, and is therefore implemented as a catheter-needle module. Those skilled in the art will recognize that term "end effector" is borrowed from robotics, where it has a somewhat different definition: a device or tool connected to the end of a robot arm.

"Imitation" means an artificial likeness that is intended to be substantially similar to an item being imitated; a copy. For example, "imitation skin," which is used in conjunction with the illustrative embodiment of the present invention, is intended to mimic or copy real skin via appropriate selection of color, appearance, feel, and overall presentation.

"Mock" means "representative;" a stand-in for a genuine article, but not intended to be a copy or reproduction of the genuine article. A mock article will typically not promote a suspension of disbelief that the mock article is the genuine article. For example, "mock skin" is not intended to mimic real skin, and typically departs from the real thing in color, appearance, feel or overall presentation.

"Pseudo" is an inclusive term that means "imitation" or "mock." For example, pseudo skin is meant to encompass both imitation skin and mock skin.

"Skin" means genuine skin.

This Detailed Description continues with an overview of a vascular-access simulator in accordance with the illustrative embodiment. Following the overview, specific embodiments of several elements of the simulator are described in greater detail.

Overview

Figure 1:
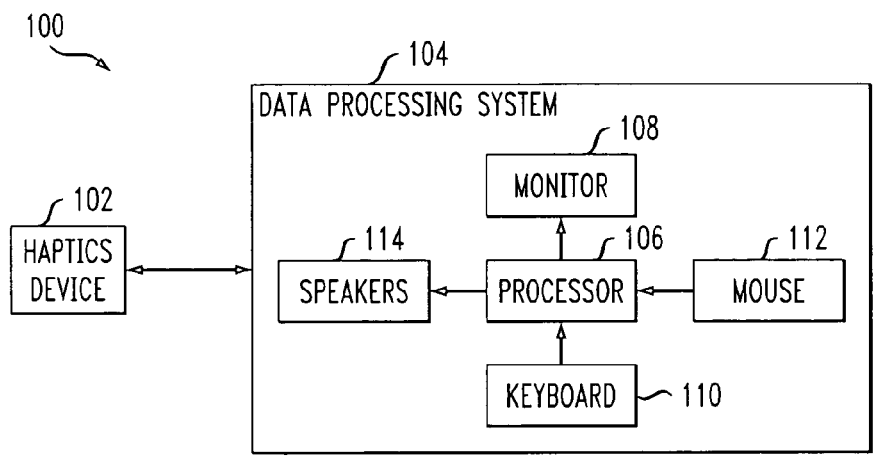
FIG. 1 depicts vascular-access simulation system 100 in accordance with the illustrative embodiment of the present invention.

The illustrative embodiment of the present invention pertains to a simulation system that provides realistic training and practice for vascular-access procedures without using human subjects. As depicted in FIG. 1, vascular-access simulator 100 includes haptics device 102 and data-processing system 104.

Haptics device 102 provides the physical interface for performing any of several simulated vascular-access procedures (e.g., intravenous catherization, central venous line placement, sternal intraosseous insertion, etc.).

The term "haptics" relates to touch (i.e., the sense of touch). A fundamental function of haptics device 102, and indeed any haptics interface, is to create a means for communication between users (i.e., humans) and machines. This "communication" is possible since humans are capable of "mechanically" interfacing with their surroundings due, at least in part, to a sense of touch. This "sense of touch" includes sensations of pressure, texture, puncture, thermal properties, softness, wetness, friction-induced phenomena, adhesions, etc. Furthermore, humans also experience vibrotactile sensations, which include the perception of oscillating objects in contact with the skin and kinesthetic perceptions (i.e., awareness of one's body state, including position, velocity, and forces supplied by the muscles). As will become clear later in this Detailed Description, our ability to perceive a variety of these sensations is exploited by haptics device 102.

To the extent that some embodiments of simulator 100 are intended for use as a practice and training tool, it is advantageous for haptics device 102 to simulate vascular-access procedures as realistically as possible and provide a quantitative measure of the user's performance of the simulated procedure. To this end, haptics device 102 possesses one or more of the following attributes, in addition to any others:

It possesses sufficient degrees-of-freedom to simulate an actual vascular-access procedure.

It offers the opportunity to perform all steps of a vascular-access procedure, including, for example, needle insertion, skin interactions (e.g., palpation, skin stretch, etc.), catheter threading, etc.

It generates appropriate skin- and venous-puncture forces.

It measures or otherwise quantifies the effects of user actions on simulated anatomy.

It generates appropriate haptic feedback (i.e., feel) during skin-interaction steps.

It is configured to provide ergonomically-correct hand position during simulated vascular-access procedures.

It is small enough so that it can be positioned in front of a computer monitor so that the haptics device and the monitor are inline with a user's forward-looking field of view.

It is at least subtly suggestive of human anatomy and does not present any substantial departures therefrom so as to support a user's ability to suspend disbelief during a simulated vascular-access procedure.

Data-processing system 104, which includes processor 106, monitor 108, keyboard 110, mouse 112, and speakers 114, supports the visual aspects of the simulation, among other functions. Processor 106 is a general-purpose processor that is capable of receiving and processing signals from haptics device 102, running software for the visual portion of the vascular-access simulation including an anatomy simulator, running calibration software for calibrating the various sensing elements used in haptics device 102, and sending control signals to haptics device 102 to support closed-loop force feedback, among other capabilities. Processor 106 comprises memory, in which the software described above is stored. In the illustrative embodiment, processor 106 is a personal computer.

Monitor 108 displays a rendering that is generated by processor 106, in conjunction with the above-referenced software. The rendering, which in some embodiments is three-dimensional, is of a region of the body (e.g., isolated arm, thorax, neck, etc.) on which a simulated vascular-access procedure is being performed. The rendering advantageously depicts visual aspects such as, without limitation, the anatomical structures that underlie the skin, local deformation of the skin in response to simulated contact, and tracking of a "virtual" instrument (e.g., a needle, etc.) through anatomical structures that underlie the skin.

Figure 2:
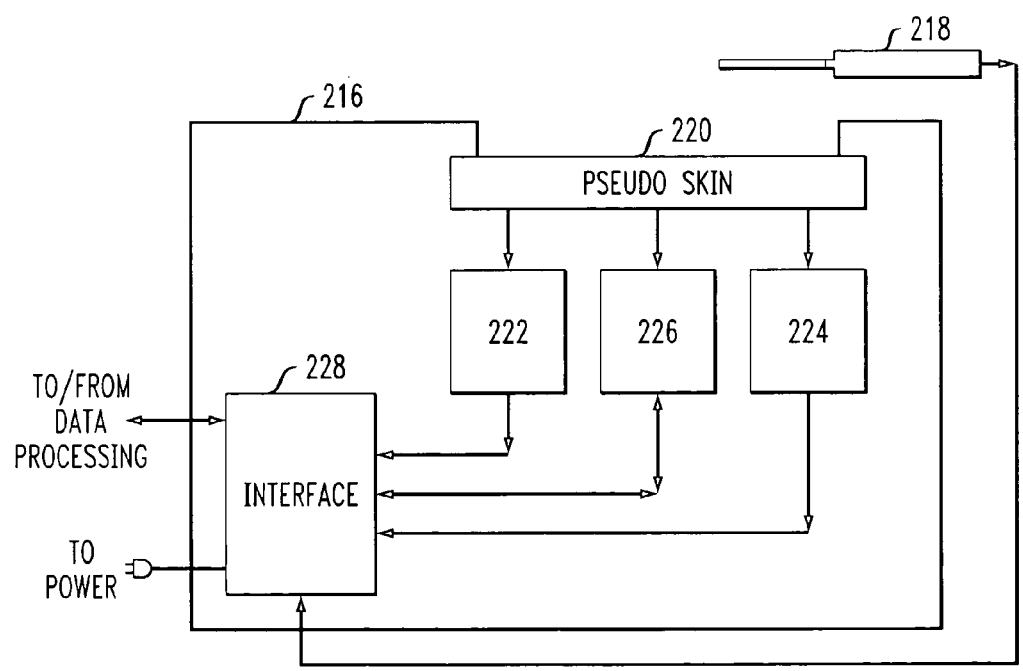
FIG. 2 depicts functional elements of haptics device 102, which is a part of vascular-access simulation system 100.

Haptics device 102 is now described in further detail. For pedagogical purposes, haptics device 102 is depicted in FIG. 2 as comprising several functional modules or elements. These include:

End effector or needle/catheter module 218;
Pseudo skin 220;
Palpation module 222;
Skin-stretch module 224;
Needle-stick module 226; and
Electronics/communications interface 228.

The functional elements of haptics device 102 listed above that relate to human anatomical features or are otherwise intended to generate resistive forces that would be sensed when penetrating such anatomical features (elements 222-228) are advantageously contained within housing 216 or otherwise located "underneath" pseudo skin 220. In an actual vascular-access procedure, the needle or catheter, of course, remains outside of the body until inserted during the procedure. Likewise, in accordance with the illustrative embodiment, the end effector—needle/catheter module 218—remains outside of housing 216 and above pseudo skin 220 until a portion of it is inserted during a simulated vascular-access procedure. In some embodiments, housing 216 is subtly shaped like a portion of a human arm, yet is nondescript enough to avoid creating a discontinuity between what is seen and what is felt.

Pseudo skin 220 is a membrane that is used in conjunction with the simulation of skin-interaction techniques, such as palpation, occlusion, and skin stretch techniques. Pseudo skin 220 is advantageously, but not necessarily, imitation skin (i.e., skin-like in appearance). To that end, pseudo skin 220 should have any one of a number of natural flesh tones. In some embodiments, pseudo skin 220 is at least somewhat resilient to enable a user to perform skin-interaction techniques. In some embodiments, pseudo skin 220 comprises a thermoplastic elastomer such as Cawiton®, which is available from Wittenburg, B.V., Hoevelaken, Netherlands. The use of imitation skin, as opposed to mock skin, is desirable because it helps a user to "suspend disbelief," which contributes to making simulator 100 more useful as a training tool.

Figure 3:
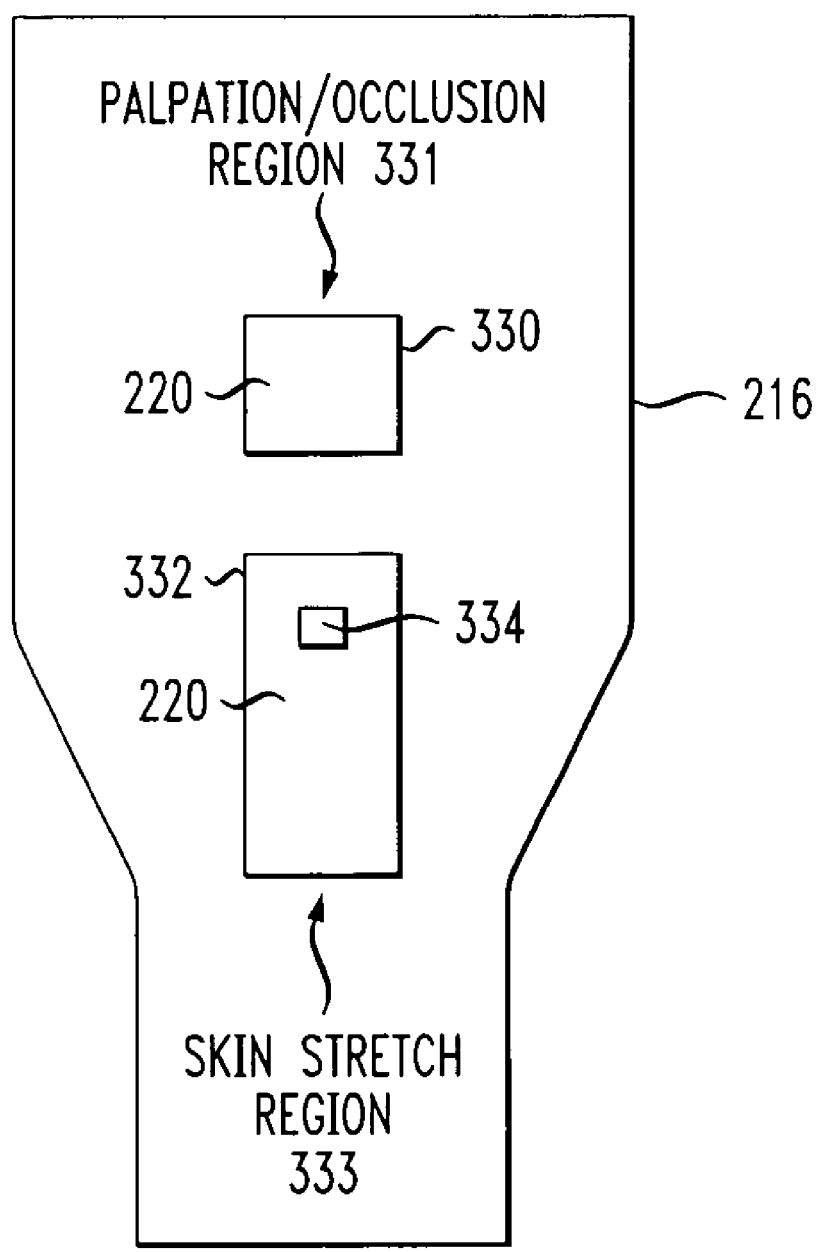
FIG. 3 depicts a top view of haptics device 102.

As depicted in FIG. 3, pseudo skin 220 is accessed for skin-interaction techniques through openings 330 and 332 in housing 216. Opening 330 defines palpation/occlusion region 331 (i.e., the site at which palpation and occlusion techniques are performed) and opening 332 defines skin-stretch region 333 (i.e., the site at which the skin-stretch technique is performed) and includes insertion point 334 for the end effector (e.g., needle/catheter module 218).

Pseudo skin 220 is disposed adjacent to the inside surface of housing 216 so that it appears to be nearly co-extensive (i.e., co-planar) with housing 216 at openings 330 and 332. This is intended to create a subtle suggestion that the surface of housing 216 is "skin" at regions other than where pseudo-skin 220 is accessed for skin-interaction techniques. Consistent with human anatomy, the remaining functional elements of haptics device 102 (elements 222-228), with the exception of needle/catheter module 218, are "hidden" beneath pseudo skin 220.

To provide a more realistic simulation of vascular-access procedures, and to provide a realistic feel and haptic feedback to a user during skin-interaction techniques, haptics device 102 includes palpation module 222 and skin-stretch module 224.

Palpation module 222 is configured so that when a user presses down on pseudo skin 220 at palpation/occlusion region 331, the user can feel a vein (i.e., a pseudo vein). In some embodiments, palpation module 222 is capable of simulating the feel of a vein and rendering it with a controllable degree of stiffness (e.g., from not stiff to very stiff) to indicate a degree of engorgement, vein depth, etc. In some further embodiments, palpation module 222 is capable of providing an indication that a palpation technique has, in fact, been conducted. In some other embodiments, palpation module 222 provides a quantitative measure of a user's palpation technique. In some additional embodiments, palpation module 222 enables a user to perform an occlusion technique, and is also capable of monitoring whether the occlusion technique has been performed and, optionally, measuring performance of the technique.

Skin-stretch module 224 is capable of monitoring skin stretch when a user stretches pseudo skin 220 within skin-stretch region 332. In some embodiments, skin-stretch module 224 is capable of measuring (i.e., quantifying) the amount of skin stretch.

The end effector (e.g., needle/catheter module 218, etc.) is inserted into haptics device 102 at insertion point 334 in opening 332. In some embodiments, simulator 100 is capable of sensing orientation of the end effector, such as to determine the direction the bevel of a needle or catheter. This is an important aspect of the real insertion technique, since proper bevel orientation reduces a patient's discomfort during needle/catheter insertion. In some embodiments, needle/catheter module 218 is configured to be very similar to a real needle and catheter.

Once inserted into haptics device 102, the tip of needle/catheter module 218 engages receiver 226, which, for the illustrative embodiment of a vascular-access simulator, is referred to as a "needle-stick module." Needle-stick module 226 supports the continued "insertion" of the needle/catheter module 218. In particular, in some embodiments, needle-stick module 226 is configured to provide one linear degree of freedom and two rotational degrees of freedom (i.e., pitch and yaw). The linear degree of freedom provides a variable insertion depth, enabling a user to advance needle/catheter module 218 into the "patient's arm" (i.e., haptics device 102). The rotational degrees of freedom enable a user to move (an engaged) needle/catheter module 218 up or down and left or right. In some embodiments, needle-stick module 226 measures insertion depth, and pitch (up/down) and yaw (left/right) angles.

In some embodiments, needle-stick module 226 provides "force feedback" to a user, whereby the user senses a variable resistance during continued advance (insertion) of needle-stick module 218. The resistance is intended to simulate penetration of the skin, a vein, and harder structures such as ligaments, bones, and the like. The resistance advantageously varies with insertion depth and the pitch and yaw of needle/catheter module 218, as described further below.

It will be understood that the "measurements" of angle, position, etc. that are obtained by the functional elements described above are obtained in conjunction with various sensors and data-processing system 104. In particular, most of the functional elements described above include one or more sensors. The sensors obtain readings from an associated functional element, wherein the readings are indicative of the rotation, displacement, etc., of the functional element. These readings, therefore, provide information concerning the manipulation of needle/catheter module 218 as well as the performance of palpation, skin-stretch, and occlusion techniques.

Each sensor then generates a signal that is indicative of the reading, and transmits the signal to electronics/communications interface 228. Sensors used in some embodiments include, without limitation, potentiometers, encoders, and MEMS devices. Those skilled in the art will know how to use and appropriately select sensors as a function of their intended use in conjunction with the functional elements described above.

Electronics/communications interface 228 receives the signals transmitted by the various functional elements of haptics device 102 and transmits them to data-processing system 104. In some embodiments, as an alternative to transmitting the received signals, electronics/communications interface 228 generates new signal(s) based on the received signals, and transmits the new signals to data-processing system 104. This latter approach requires a substantial increase in processing power and data management (relative to simply transmitting the received signals) and is generally a less-preferred approach. As described later below, electronics/communications interface 228 also receives signals from data processing system 104 and transmits them to needle-stick module 226 as part of a closed loop force-feedback system. Furthermore, electronics/communications interface 228 distributes power to the various functional modules, as required.

Data-processing system 104 receives the measurement data and, using the simulation software, calculates the forces that are being applied by the user during the skin-interaction procedures. Furthermore, using an anatomical model, data-processing system 104 calculates the position and angle of a virtual needle within a simulated anatomy (e.g., arm, etc.). Data-processing system 104 displays, on monitor 108, a rendering of the appropriate anatomy (e.g., arm, etc.) and displays and tracks the course of a virtual needle within this anatomy.

Furthermore, based on the position and course of the virtual needle (as calculated based on the position and orientation of needle/catheter module 218), data-processing system 104 generates control signals that are transmitted to needle-stick module 226. These control signals vary the resistive force presented by needle-stick module 226 to account for various (virtual) anatomical structures (e.g., vein, tissue, tendons, bone, etc.) that needle/catheter module 218 encounters, based on the simulation. As a consequence, the resistance to continued needle/catheter insertion that is experienced by a user of simulator 100 is consistent with the resistance that would be sensed by a practitioner during an actual vascular access procedure.

Having completed the overview of vascular-access simulator 100 and haptics device 102, further description of palpation module 222 and skin-stretch module 224 is now provided.

Palpation Module

Palpation module 222 advantageously provides the following functionality:

Enables a user to search for a vein.
Provides haptic feedback to user.
Provides indirect measurement of palpation force.
Enables a user to occlude a vein.

Evaluation of vascular-access procedures and anatomy led to the recognition that, in addition to the listed functionality, it is desirable for palpation module 222 to exhibit certain characteristics, as described below:

The vein should be felt but not "seen."
A vein should not be felt when it's not present.
If pressed hard, the vein should "disappear."
The vein should have a "spongy" or "yielding" feel when palpated.
Vein stiffness should be controllable.

A purpose of palpation during a real vascular-access procedure is to locate a vein that is not visually discernable (e.g., due to advanced age, general health, the depth of the vein, etc.). Consequently, a pseudo vein should not be visually discernable in palpation/occlusion region 331 of haptics device 102.

In conjunction with data-processing system 104 and the visual portion of the simulation, in some embodiments, a user "searches" for a vein as a part of the palpation technique. (This is performed using mouse 112, which moves a rendering of a user's fingers over a rendering of a portion of the human body, e.g., the arm, etc., that appears in monitor 108, thereby designating a location at which to palpate.) Veins will not be present at all of the user-designated palpation locations. If a vein is not present, as determined by the anatomical model being used in conjunction with data-processing system 104, a vein should not be tactilely discernable by a user at palpation/occlusion region 331.

If a medical practitioner presses hard on a vein, the practitioner will lose the feel of the vein. As a consequence, if a vein has been located, but a user presses too hard in palpation/occlusion region 331, the feel of the pseudo vein is advantageously lost.

When palpated, veins have a "spongy" feel; that is, they yield to palpation pressure and do not offer any significant resistive force. It is desirable, therefore, for a user that is palpating a pseudo vein at palpation/occlusion region 331L of haptics device 102 to experience to this sensation of "yielding" or "sponginess."

The perceived "stiffness" of a vein is related to its degree of engorgement (with blood). An engorged vein will feel relatively stiffer while a less-engorged vein will feel relatively less stiff. Engorgement and perceived stiffness will vary from patient-to-patient, etc. This variation is due to a variety of factors, including the age and general health of the patient, etc. Palpation module 222 is, therefore, advantageously capable of controlling the perceived stiffness of a vein.

Palpation assembly 436 depicted in FIGS. 4A-4E, which is an illustrative physical realization of palpation module 222, possesses all of the functionality and exhibits all the characteristics listed above. But it is understood that palpation assembly 436 is but one physical realization of palpation module 222; others are contemplated. And for some applications, such as those in which cost is a consideration, it might be desirable or otherwise necessary to implement palpation module 222 such that it provides only some (one or more) of the functions and exhibits only some (one or more) of the characteristics listed above. Those skilled in the art will be able to build and use such other embodiments of palpation module 222 in light of the present disclosure.

In accordance with some embodiments of the palpation module 222, user-applied pressure on a pseudo vein is countered by a controllable, but substantially constant force. In palpation assembly 436, this force is a magnetic force.

Palpation assembly 436 is physically configured so that the magnetic force is perceived to be substantially constant over the intended range of movement during palpation. This provides the desired "spongy" or "yielding" sensation when the pseudo vein is palpated. The pseudo vein feels spongy or yielding because there is substantially no perceptible change in force as the pseudo vein is pressed. This is contrasted with some other embodiments in which the force that opposes motion of the pseudo vein is provided by a spring. In such embodiments, as the pseudo vein is palpated, the spring compresses, thereby providing an increasing resistance to motion. As a consequence, a user palpating the pseudo vein would not perceive it as being spongy or yielding, as desired.

By changing the magnitude of the magnetic force, a greater or lesser (but still substantially constant) force will oppose movement of the pseudo vein. Consequently, a user palpating the pseudo vein will sense "stiffness."

Figure 4A:
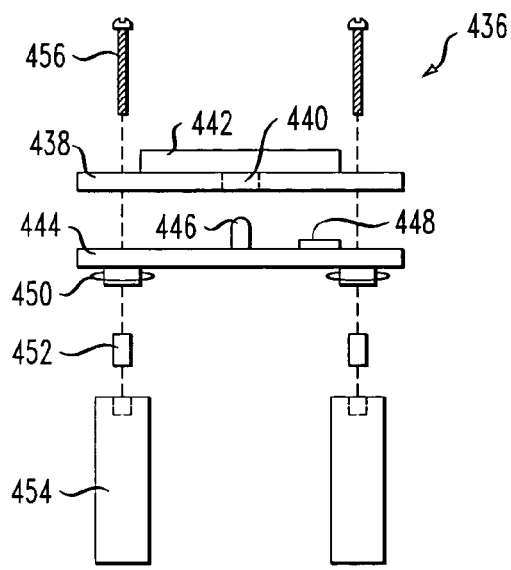
FIG. 4A depicts an exploded view of a palpation assembly in accordance with the illustrative embodiment of the present invention.
Figure 4B:
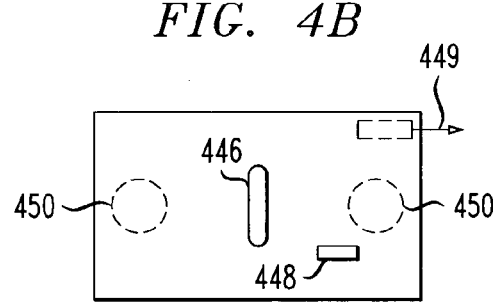
FIG. 4B depicts a top view of a bottom plate of the palpation assembly of FIG. 4A.
Figure 4D:
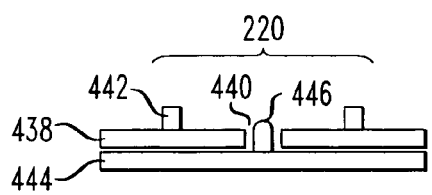
FIG. 4D depicts a pseudo vein extending above the upper surface of the upper plate of the palpation assembly of FIG. 4A.
Figure 4C:
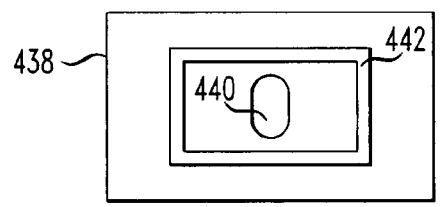
FIG. 4C depicts a top view of a top plate of the palpation assembly of FIG. 4A.

FIG. 4A depicts an exploded side view of palpation assembly 436. As shown in that Figure, palpation assembly 436 includes upper plate 438, lower plate 444, pseudo vein 446, coils 450, permanent magnets 452, and standoffs 454, arranged as shown. A top view of lower plate 444 is depicted in FIG. 4B, in which pseudo vein 446 and reflective object sensor 448 are shown. Coils 450, which are disposed on lower surface of lower plate 444, are shown in phantom. Also depicted in phantom in FIG. 4B is electrical connection 449, which places palpation assembly 436 in electrical connection with electronics/communications interface 228. A top view of upper plate 438 is depicted in FIG. 4C, in which vein-receiving slot 440 and collar 442 are shown.

In some embodiments, lower plate 444 is a printed circuit board, which is useful for conducting electrical signals to coils 450. In other embodiments, lower plate 444 can be made of aluminum or other metals, plastic, or other conveniently available materials. In some embodiments, upper plate 438 is made of aluminum. In embodiments in which the sensor that measures user manipulations of palpation assembly 436 is reflective object sensor 448, upper plate 438 should be formed from reflective metal or other reflective materials. Alternatively, in some other embodiments, upper plate 438 is formed from a non-reflective material but includes a reflective material at an appropriate location.

In the illustrative embodiment, pseudo vein 446 is a mock vein. It comprises a solid material, such as aluminum, hard plastic, etc. In other embodiments, an imitation vein can suitably be used. Coils 450 are simply windings of wire that are electrically coupled to a source of current.

Permanent magnets 452 advantageously comprise materials that exhibit relatively high magnetic field strength for their weight, such as, without limitation, rare-earth magnets. Rare-earth magnets include, for example, neodymium iron boron (NdFeB) and samarium cobalt (SmCo). Rare-earth magnets are commercially available from Magnet Applications, Inc. of Horsham, Pa., among others. Standoffs 454 are formed of aluminum, stainless, plastic, etc. A variety of spacers, bumpers, and other incidental parts that are typically included and serve to prevent contact between the various elements, provide height adjustment, serve as fasteners, etc., are not depicted in the Figure for the sake of clarity.

With continuing reference to FIG. 4A, screws 456 pass through upper plate 438, lower plate 444, coils 450, and screw into magnets 452. Upper plate 438 is stationary, fixed to screws 456 (by nuts, etc., not pictured) while lower plate 444 is not fixed so that it is free to move upward or downward along the screws. Standoffs 454 raise the plates 438 and 444 and pseudo vein 446 within housing 216 to a height that is appropriate for performing palpation at palpation/occlusion region 331.

The upper portion of each magnet 452 extends into coils 450. When coils 450 are energized by the application of current, a magnetic field is generated. The direction of the current flow is set so that the interaction of the magnetic fields from coils 450 and the upper pole of permanent magnets 452 is repulsive. For this arrangement, the graph of field strength vs. position along the axial direction (of the coil) is an inverted parabola. That is, as coil 452 moves in either direction away from the "upper" poles of magnets 452 (i.e., either "above" magnets 452 or toward the middle of magnets 452), field strength drops. By virtue of this arrangement, palpation assembly 436 is being operated at the relatively flat part of the field strength vs. position curve (i.e., near the maxima). As a consequence, a user senses a substantially "constant" force in opposition to palpation of pseudo vein 446.

The repulsive force generated between coils 450 and permanent magnets 452 urges lower plate 444 towards upper plate 438. As lower plate 444 moves towards upper plate 438, pseudo vein 446 passes through vein-receiving slot 440 in the upper plate. Urged upwardly by the repulsive magnetic force, lower plate 444 ultimately (nearly) abuts upper plate 438. Contact between the plates is advantageously prevented using thin Teflon® bumpers, etc. (not depicted). In this energized position, which is depicted in FIG. 4D, pseudo vein 446 extends above upper plate 438 and is available for palpation.

Pseudo skin 220 is advantageously formed of a material that is opaque so that pseudo vein 446 is not visible beneath it. Furthermore, the impression or shape of pseudo vein 446 should not be discernable underneath pseudo skin 220, as would occur if the pseudo vein was in contact with the pseudo skin. To this end, pseudo vein 446 does not extend above collar 442, which supports pseudo skin 220. Collar 442 therefore serves as a stand-off to prevent contact between the pseudo vein and pseudo skin (before palpation). As a consequence, pseudo vein 446 is neither directly nor indirectly visually discernable below pseudo skin 220.

As a user palpates imitation skin 220 in palpation/occlusion region 331, pseudo vein 446 is felt. The pseudo vein yields to gentle downward pressure by a user, the magnetic repulsion creating the desired "spongy" feel.

Figure 4E:
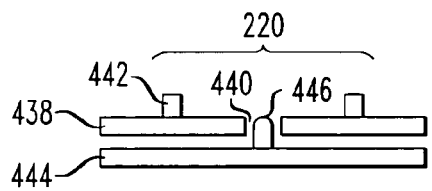
FIG. 4E depicts the pseudo vein flush with the upper surface of the upper plate of the palpation assembly of FIG. 4A.

When, according to the simulation, a vein should not be present, pseudo vein 446 retracts to a position that is substantially flush with the upper surface of upper plate 438 (see, FIG. 4E). This is accomplished by reducing current to coils 450, or by simply completely de-energizing the coils, which causes the lower plate 444 to drop away from upper plate 438. The same result obtains when pseudo vein 446 is palpated (i.e., pressed) with "too" much force by a user.

In this retracted position, pseudo vein 446 is not tactilely discernable by a user that is attempting a palpation procedure in palpation/occlusion region 331. By virtue of this structural configuration, pseudo vein 446 is flush with the surface of upper plate 438 when the pseudo vein retracts. As a consequence, vein-receiving slot 440 cannot be felt by a user. This is desirable, since vein-receiving slot 440 is not analogous to any anatomical structure within the body.

The perceived stiffness of pseudo vein 446, which is intended to be an indicator of vein engorgement (with blood), can be altered by adjusting the amount of current to coils 450. For example, with the application of a suitably small amount of current, a repulsive force that just overcomes gravity can be generated. In such a case, the user cannot sense pseudo vein 446 during palpation. With the application of more current, a stronger repulsive force is generated, wherein a user that is palpating pseudo vein 446 is able to sense it. A relatively smaller repulsive force is used to mimic the feel of a vein that is not engorged with blood. A relatively greater repulsive force is used to mimic a stiff, blood-gorged vein. In this fashion, a range of vein stiffness is controllably presented to a user.

A quantitative measure of a user's palpation technique is obtained in conjunction with the use of a sensor. In the illustrative embodiment, a reflective object sensor 448 is used. As is well known, a reflective object sensor typically consists of an infrared emitting diode and a phototransistor. The phototransistor responds to radiation from the diode only when a reflective object passes within its field of view. One suitable reflective object sensor is a miniature surface mount device no. QRE1113.GR available from Fairchild Semiconductor of South Portland, Me.

Since reflective object sensor 448 is disposed on the upper surface of lower plate 444, the diode in sensor 448 responds to radiation reflected from the lower surface of upper plate 438. The reflected radiation is used to determine the distance between lower plate 444 and upper plate 438. This distance is used, in some embodiments, to estimate the amount of force applied by the user during a palpation procedure.

Palpation assembly 436 also enables a user to perform an occlusion technique, as previously described. In the illustrative embodiment, occlusion is monitored using pseudo vein 446. More particularly, as a user applies pressure to pseudo vein 446, it moves downward along with lower plate 444. This movement is captured by reflective object sensor 448. The downward movement is used as an indicator that an occlusion technique has been performed. In some embodiments, to monitor occlusion, the repulsive force generated by coils 450 is adjusted to be just sufficient to overcome gravity. In such a case, the user cannot sense pseudo vein 446.

Skin-stretch Module

Skin-stretch module 224 advantageously provides the following functionality and characteristics:
 Enables a user to stretch the skin.
 Provides haptic feedback to user.
 Provides a realistic feel to a user.
 Measures the amount of skin stretch.

Figure 5A:
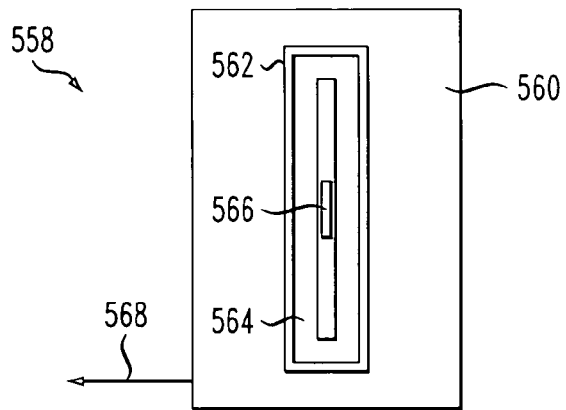
FIG. 5A depicts a top view of a skin-stretch assembly in accordance with the illustrative embodiment of the present invention.

Skin-stretch assembly 558 depicted in FIG. 5A, which is an illustrative physical realization of skin-stretch module 224, possesses all of the functionality and exhibits all the characteristics listed above. Some other embodiments of skin-stretch module 224 include only some (one or more) of the functionality and characteristics listed above. Those skilled in the art will be able to build and use such other embodiments of palpation module 222 in light of the present disclosure. Referring to FIG. 5A, skin-stretch assembly 558 includes platform 560 and linear potentiometer 564. The linear potentiometer, which is disposed in opening 562 in platform 560, includes potentiometer slide 566. Skin-stretch assembly 558 is placed in electrical connection with electronics/communications interface 228 via electrical connection 568. Linear potentiometer 564 is commercially available from Bourns Co. of Riverside, Calif. and others.

Figure 5B:
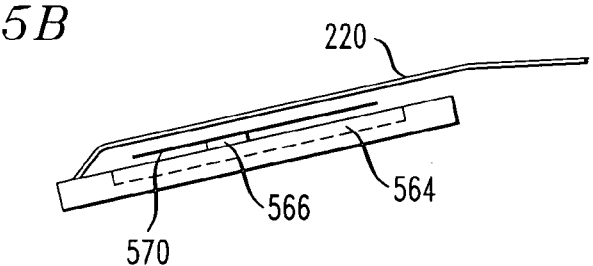
FIG. 5B depicts a side view of the skin-stretch assembly of FIG. 5A and showing the skin-stretch assembly disposed beneath pseudo skin.
Figure 5C:
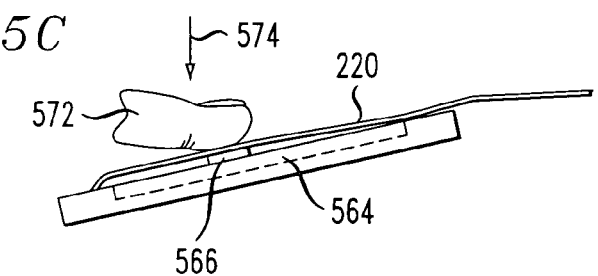
FIG. 5C depicts a downward force being applied to the pseudo skin, which forces it into contact with a slide of a linear potentiometer.
Figure 5D:
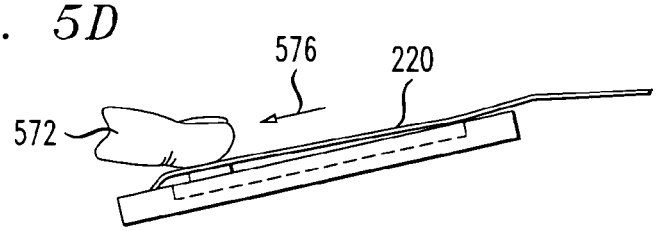
FIG. 5D depicts a pulling force being applied to the pseudo skin, which causes the slide of the linear potentiometer to move, thereby tracking the stretch of the pseudo skin.

As depicted in FIG. 5B, skin-stretch assembly 558 is disposed beneath pseudo skin 220 in skin-stretch region 333. Plate 570, which is disposed between pseudo skin 220 and slide 566, is coupled to the slide. The plate is sized so that it extends to edges of skin-stretch region 333. FIG. 5C depicts thumb 572 of a user applying downward pressure 574 to pseudo skin 220 in the skin-stretch region. This downward pressure forces pseudo skin 220 into contact with plate 570 (not depicted in FIG. 5C). Once in contact with plate 570, any movement of pseudo skin 220 along the axial direction of potentiometer 564 will cause plate 570 to move, and potentiometer slide 566 to move along with it. FIG. 5D depicts thumb 572 of a user applying a pulling force 576 that stretches pseudo skin 220. As the pseudo skin stretches, plate 570 (not depicted in FIG. 5D) and potentiometer slide 566 both move, monitoring the stretch. Linear potentiometer 564 generates a signal that is indicate of the amount of skin stretch and transmits it to electronics/communications interface 228 via electrical connection 568.

It is to be understood that the above-described embodiments are merely illustrative of the present invention and that many variations of the above-described embodiments can be devised by those skilled in the art without departing from the scope of the invention. For example, in this specification, numerous specific details are provided in order provide a thorough description and understanding of the illustrative embodiments of the present invention. Those skilled in the art will recognize, however, that the invention can be practiced without one or more of those details, or with other methods, materials, components, etc.

Furthermore, in some instances, well-known structures, materials, or operations are not shown or described in detail to avoid obscuring aspects of the illustrative embodiments. It is understood that the various embodiments shown in the Figures are illustrative, and are not necessarily drawn to scale. Furthermore, the particular features, structures, materials, or characteristics can be combined in any suitable manner in one or more embodiments. It is therefore intended that such variations be included within the scope of the following claims and their equivalents.

We claim:

1. An apparatus comprising:
pseudo skin; and
a palpation module for enabling a user to palpate a pseudo vein, wherein:
(a) the palpation module comprises the pseudo vein;
(b) the palpation module is disposed beneath the pseudo skin;
(c) the palpation module comprises a first magnetic-field generating element and a second magnetic field generating element, wherein the first and second magnetic-field generating elements are operated so that an interaction of the magnetic fields generated therefrom is repulsive; and (d) the repulsive interaction is experienced by the user as a force that opposes downward motion of the pseudo vein.

2. The apparatus of claim 1 wherein the pseudo vein yields to applied occlusion pressure, such that it moves downward, wherein downward movement is used as an indicator that an occlusion technique has been performed.

3. The apparatus of claim 1 further comprising a skin-stretch module, wherein the skin-stretch module is disposed beneath the pseudo skin, and wherein the skin-stretch module measures an amount by which the user stretches the pseudo skin.

4. The apparatus of claim 1 further comprising a rigid pseudo vein, wherein the palpation module is operable to vary a simulated stiffness of the rigid pseudo vein.

5. The apparatus of claim 1 further comprising a rigid pseudo vein, wherein the palpation module controllably obscures said pseudo vein under said pseudo skin such that said pseudo vein can be felt, or not felt, as desired.

6. The apparatus of claim 1 further comprising a rigid pseudo vein, wherein the palpation module is arranged so that: (a) the rigid pseudo vein moves downward in response to applied pressure by the user; and (b) when the user applies a sufficient amount of force to the pseudo vein, the pseudo vein cannot be felt.

7. The apparatus of claim 6 wherein a magnitude of the repulsive interaction is substantially constant during application thereof.

8. The apparatus of claim 7 wherein, although constant during application, the magnitude of the repulsive interaction can be varied.

9. An apparatus comprising a palpation module, wherein said palpation module comprises:
a pseudo vein;
a first plate, wherein the pseudo vein is disposed on the first plate, and wherein the first plate is movable toward a second plate;
wherein the second plate is disposed above said first plate in a fixed position, and wherein said second plate has an opening that is dimensioned and located to receive the pseudo vein; and
an arrangement for generating a first magnetic field, wherein: (a) the arrangement is operatively coupled to the second plate; and (b) the first magnetic field interacts with a second magnetic field, wherein the interaction is experienced by a user as a force that opposes a force that is applied to the pseudo vein by a user.

10. The apparatus of claim 9 wherein the palpation module is operable to perform at least one of following operations: measure a change in position of the pseudo vein and vary a simulated stiffness of the pseudo vein.

11. The apparatus of claim 9 wherein said pseudo vein comprises a rigid member.

12. The apparatus of claim 9 wherein a magnitude of the first magnetic force is adjustable.

13. The apparatus of claim 9 further comprising a sensor, wherein the sensor generates a signal that is indicative of a distance between the first plate and the second plate.

14. An apparatus comprising:
pseudo skin; and
a palpation module for enabling a user to palpate a pseudo vein, wherein said palpation module is disposed beneath the pseudo skin and further wherein: (a) the palpation module comprises a permanent magnet; (b) the palpation module comprises a coil that is energizable via a current to generate a first variable-strength magnetic field; and (c) the palpation module is arranged so that the pseudo vein can be rendered discernable or not discernable by feel to the user as a function of the current applied to the coil.

15. An apparatus comprising: Pseudo skin; and a palpation module for enabling a user to palpate a pseudo vein, wherein said palpation module is disposed beneath the pseudo skin and further wherein: (a) the palpation module comprises a permanent magnet having a fixed strength magnetic field; (b) the palpation module comprises a coil that is energizable via a current to generate a variable-strength magnetic field; and (c) the palpation module is arranged so that an interaction of the fixed strength magnetic field and the variable-strength magnetic field is repulsive and is experienced by the user as a force opposing downward movement of the pseudo vein.

16. The apparatus of claim 15 wherein the force experienced by the user is a substantially constant during application.

17. An apparatus comprising: Pseudo skin; and a palpation module for enabling a user to palpate a rigid pseudo vein, wherein said palpation module is disposed beneath the pseudo skin and further wherein the palpation module: (a) comprises a permanent magnet having a fixed strength magnetic field; (b) comprises a coil that is energizable via a current to generate a variable-strength magnetic field; and (c) is arranged so that the perceived stiffness of the rigid pseudo vein is alterable by adjusting the current applied to the coil.

* * * * *

UNITED STATES PATENT AND TRADEMARK OFFICE
CERTIFICATE OF CORRECTION

PATENT NO. : 7,625,211 B2
APPLICATION NO. : 10/807017
DATED : December 1, 2009
INVENTOR(S) : Feygin et al.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 1574 days.

Signed and Sealed this

Twenty-sixth Day of October, 2010

David J. Kappos
*Director of the United States Patent and Trademark Office*